United States Patent
Chang et al.

[11] Patent Number: 5,920,371
[45] Date of Patent: *Jul. 6, 1999

[54] VERSATILE HEADBAND OPTICAL MOUNTING ASSEMBLY

[76] Inventors: Byung Jin Chang, 5521 Overbrook Dr., Ann Arbor, Mich. 48105; David Nowak, 7300 Park Lane Dr., Dexter, Mich. 48130

[21] Appl. No.: 08/893,894

[22] Filed: Jul. 11, 1997

Related U.S. Application Data

[60] Provisional application No. 60/021,252, Jul. 12, 1996.
[51] Int. Cl.$^6$ .................................................. G02C 1/00
[52] U.S. Cl. ................................ 351/158; 2/453; 359/409
[58] Field of Search ............................. 351/158; 2/445, 2/452, 453; 359/408, 409, 811, 815, 817, 818

[56] References Cited

U.S. PATENT DOCUMENTS

| | | | |
|---|---|---|---|
| D. 296,337 | 6/1988 | Caplan | D16/133 |
| 1,289,998 | 12/1918 | Yassukovitch | 351/57 |
| 2,445,203 | 7/1948 | Bowers | 2/453 |
| 2,659,266 | 11/1953 | Swisher | 351/245 |
| 3,597,041 | 8/1971 | Frantz et al. | 350/72 |
| 4,196,966 | 4/1980 | Malis | 350/145 |
| 4,364,645 | 12/1982 | Feinbloom | 351/204 |
| 4,449,787 | 5/1984 | Burbo et al. | 350/538 |
| 4,659,196 | 4/1987 | Gazeley | 351/57 |
| 4,681,413 | 7/1987 | Schmidt et al. | 351/205 |
| 4,818,086 | 4/1989 | Moore | 350/552 |
| 5,179,735 | 1/1993 | Thomanek | 2/6 |
| 5,335,110 | 8/1994 | Shin | 359/480 |
| 5,372,504 | 12/1994 | Buechler | 434/35 |
| 5,381,263 | 1/1995 | Nowak et al. | 359/411 |
| 5,446,507 | 8/1995 | Chang | 351/158 |
| 5,463,500 | 10/1995 | Buchroeder | 359/744 |
| 5,515,209 | 5/1996 | Buchroeder et al. | 359/744 |
| 5,535,053 | 7/1996 | Baril et al. | 359/409 |

FOREIGN PATENT DOCUMENTS 2251702  7/1992  United Kingdom.

*Primary Examiner*—Huy Mai
*Attorney, Agent, or Firm*—Gifford,Krass,Groh, Sprinkle,Anderson & Citkowski, PC

[57] ABSTRACT

A versatile optical mounting assembly utilizes a headband mount having a forward portion and a vertical member having upper and lower ends. The forward portion of the headband mount includes a slide assembly which receives the upper end of the vertical member, allowing the vertical member to be vertically adjusted and locked into place once a desired position is achieved. A multiple-degree-of freedom clamp assembly is further provided to connect the lower end of the vertical member to the top edge of the eyeglass frames, facilitating first and second rotational movements about separate axes. The invention may also be used in conjunction with an ocular mounting assembly, in which case a slide rail is centrally attached to the eyeglass frames at a point proximate to where the clamp assembly connects the lower end of the vertical member to the top edge of the eyeglass frames. A mounting pad is received by the slide rail which may be vertically adjusted and locked into place once a desired orientation is achieved, and a second multiple-degree-of freedom clamp assembly is preferably used to connect the mounting pad to the ocular mounting assembly.

8 Claims, 4 Drawing Sheets

VERSATILE HEADBAND OPTICAL MOUNTING ASSEMBLY

Reference to Related Applications

This application claims priority of provisional application Ser. No. 60/021,252, filed Jul. 12, 1996, and U.S. patent application Ser. No. 08/370,535, filed Jan. 9, 1995, now abandoned, which is a continuation-in-part of U.S. patent application Ser. No. 08/093,831, filed Jul. 19, 1993, now U.S. Pat. No. 5,381,263.

FIELD OF THE INVENTION

This invention relates generally to optical instrumentation of the type used by medical and dental practitioners and, in particular, to a versatile headband optical mounting assembly.

BACKGROUND OF THE INVENTION

Increasingly, medical and dental practitioners are being required to use optical instrumentation to assist in certain procedures. During surgery, for example, magnifying loupes are often used during delicate operations, and typically these are used in conjunction with high-intensity lamps, which may be worn on the person of the medical professional. The same holds true of dental practitioners. In addition to higher-powered optical instruments and high-intensity lamps, such individuals may also use CCD cameras, or splash guards to protect against communicable diseases such as AIDS. Some or all of these or other devices may also be used in conjunction with prescription eyeglasses, which may incorporate integral or supplemental filters associated with protection against certain wavelengths of light, as might be encountered through the use laser surgery, for example.

With the introduction of these various instruments and accessories, it has become increasingly important to provide mounting assemblies which are lightweight and versatile, to ensure that a given user will be both comfortable and able to adjust whatever device is being used in accordance with that individual's preference.

Commonly assigned U.S. Pat. No. 5,381,263, entitled FIVE-DEGREE-OF-FREEDOM OCULAR MOUNTING ASSEMBLY, which is incorporated herein by reference, is directed toward a very versatile adjustment mechanism that can be used in conjunction with a pair of eyeglass frames or a headband mount, to ensure that a pair of oculars may be adjusted by a user in multiple dimensions to ensure correct magnification, while providing a flip-up capability during periods of non-use. The present invention further emphasizes, and in some cases, extends the teachings of this patent, with a particular emphasis on headband mounting of eyeglass lenses, frames and oculars, depending upon the circumstances surrounding a particular application.

SUMMARY OF THE INVENTION

This invention provides a versatile optical mounting assembly for use with a pair of eyeglass frames having a top edge defining a horizontal axis. According to the invention, the eyeglass frames may include forward or rearwardly oriented nosepads, hinged temple supports and/or side shields which may be hinged or rigid and integrally formed with the eyeglass frames.

Broadly, the invention utilizes a headband mount having a forward portion and a vertical member having upper and lower ends. In the preferred embodiment, the forward portion of the headband mount includes a slide assembly which receives the upper end of the vertical member, allowing the vertical member to be vertically adjusted and locked into place once a desired position is achieved. A multiple-degree-of freedom clamp assembly is further provided in the preferred embodiment to connect the lower end of the vertical member to the top edge of the eyeglass frames, with the clamp assembly at least facilitating a first and second rotational movements about separate axes, each parallel to the horizontal axis.

In a preferred embodiment, the lower end of the vertical member and the top edge of the eyeglass frames both feature a pair of opposed horizontal pins, for a total of four such pins, and clamp assembly adjustably clamps onto the four pins. The invention may also be used in conjunction with an ocular mounting assembly, in which case a slide rail is centrally attached to the eyeglass frames at a point proximate to where the clamp assembly connects the lower end of the vertical member to the top edge of the eyeglass frames. A mounting pad is received by the slide rail which may be vertically adjusted and locked into place once a desired orientation is achieved, and a second multiple-degree-of freedom clamp assembly is preferably used to connect the mounting pad to the ocular mounting assembly.

DETAILED DESCRIPTION OF THE INVENTION

Figure 1:
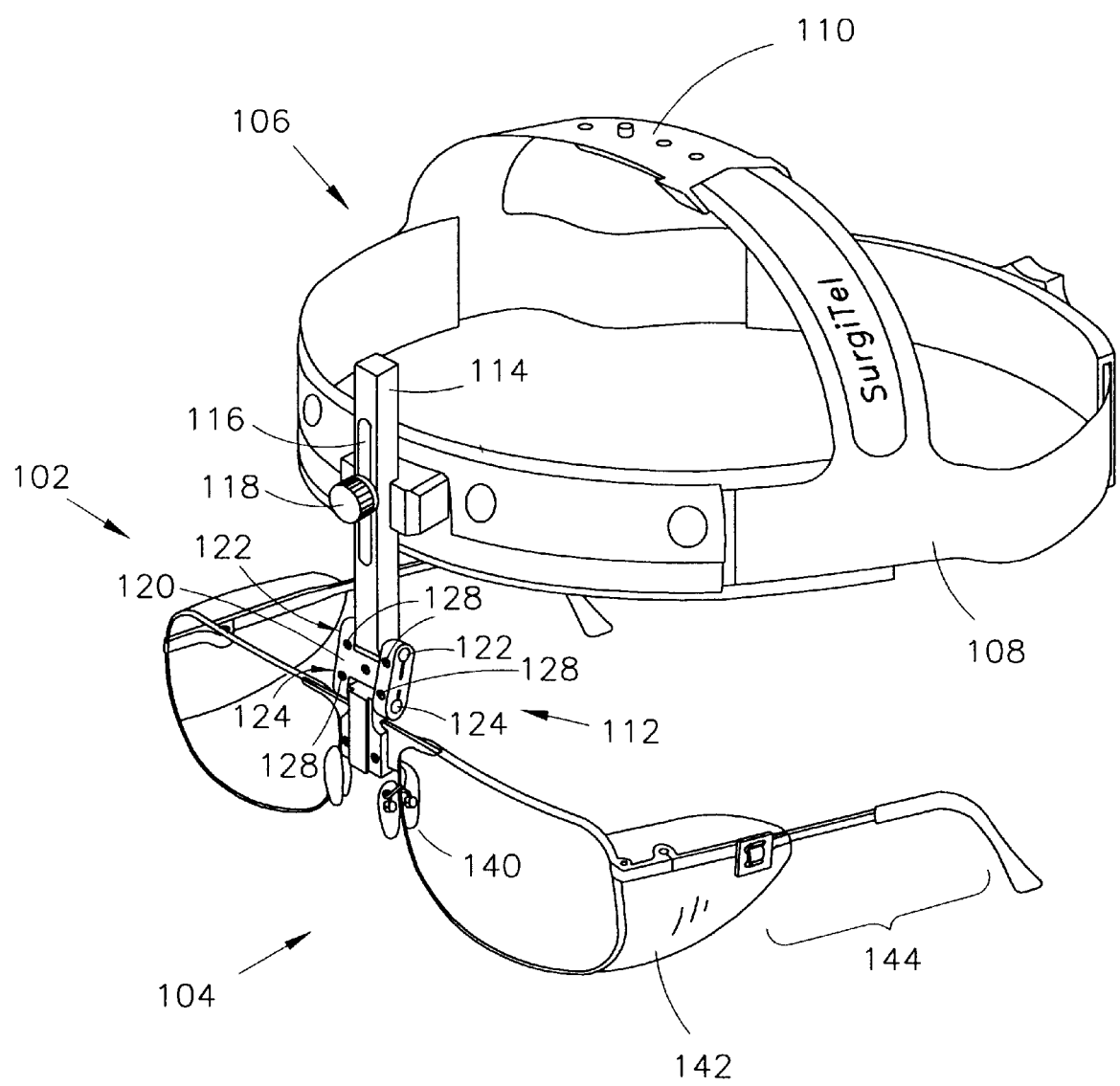
FIG. 1 illustrates, from an oblique perspective, and embodiment of the invention wherein a pair of eyeglass frames are slidingly attached to a headband system through a multiple-degree-of-freedom mounting assembly.

FIG. 1 illustrates, generally at 102, an embodiment of the present invention wherein a pair of eyeglass frames 104 are mounted to a headband 106 by way of a multiple-degree-of-freedom assembly which will be described in further detail below. It should be noted that although the headband 106 is shown having an annular strap portion 108 which fits around a wearer's head and an upper adjustable strap portion 110, according to this invention the term "headband" should be taken to mean any type of arrangement, flexible or otherwise, which in any way attaches to the head of a wearer. As just one example, a single strap such as 108 but without the over strap 110 may be used, and, as another example, a padded skull cap may alternatively be adopted.

The eyeglass frames 104 are connected to the headband through a multiple-degree-of-freedom hinge assembly 112, which, in turn, connects to a vertically adjustable member 114. The member 114 includes a slot 116 through which a manually operable dial 118 protrudes, enabling the member 114 to slide up and down with respect to the headband 106 then, having achieved a desired orientation, locked into place utilizing the dial 118.

The hinge assembly 112 may be similar to that described in jointly owned U.S. Pat. No. 5,381,263 in that, in a preferred embodiment, it includes a clamp assembly 120 which engages with an upper pair of opposing hinge pins 122 associated with the vertical member 114, and a pair of lower hinge pins 124 associated with the eyeglass frames 104. Although not necessary to this invention, in the preferred embodiment, four adjustment screws 128 are provided for independent tightening and adjustment of each of the four hinge pins 122 and 124. It should be noted in this embodiment, and the other to be described below, that although the eyeglass frames 104 are shown having nose pads 140, side shields 142 and temple portions 144, any or all of these may be provided or eliminated while keeping within the scope of this invention.

Figure 2:
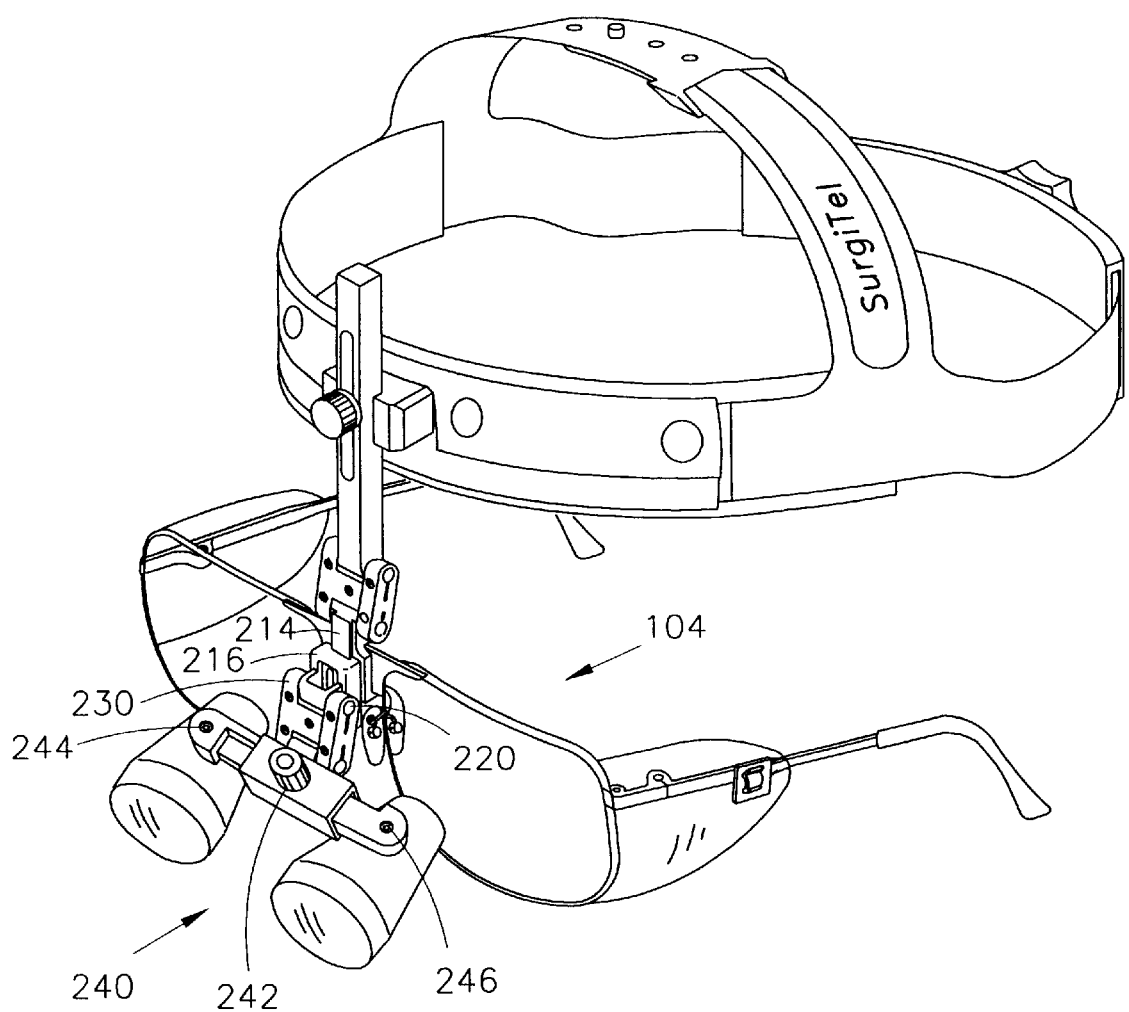
FIG. 2 illustrates the integration of frame-mounted loupes having side shields and temples to a headband mounting fixture through double hinges according to the invention.

Building onto the basic structure of FIG. 1, FIG. 2 illustrates a more robust embodiment of the invention wherein, clamping the bridge portion of the eyeglass frames 104 is an assembly providing a forwardly oriented vertical guide rail 214 which engages with a vertical slide member 216 which, in turn, provides a pair of opposing pins 220 which engage with a second multiple-degree-of-freedom hinge assembly 230. This second hinge assembly 230, which may be similar to that described in U.S. Pat. No. 5,381,263 referenced above, in turn engages with an ocular mounting assembly 240, thereby providing an enormous flexibility in terms of adjustment capability.

Indeed, through the arrangement shown in FIG. 2, at least nine degrees of freedom are possible, as follows:

1. vertical height adjustment through member 114;
2. a first rotational degree of freedom through pins 122;
3. a second rotational capability through pins 124;
4. a second vertical degree of freedom through rail and vertical slide member 216;
5. a third rotational capability through pins 220;
6. a fourth rotational capability through the pins associated with the oculars;
7. an interpupillary distance adjustment made possible by dial 242;
8. a side-to-side adjustment capability for the right eye made possible through adjustment screw 244; and
9. a side-to-side adjustment capability for the left eye made possible through adjustment screw 246.

Adding to this the potential adjustment capability made possible by screws 130 associated with pins 124, ten degrees of freedom are provided by this assembly. Of course, it should be noted that in order to strike a reasonable compromise between readily available adjustment and a flip-up capability, preferably most of the rotational adjustment capabilities are tightened once a desired orientation is achieved, leaving one or a few of the rotational adjustments to be used for a flip-up capability during a particular procedure, so as to readily move between periods of use and temporary non-use.

Figure 3:
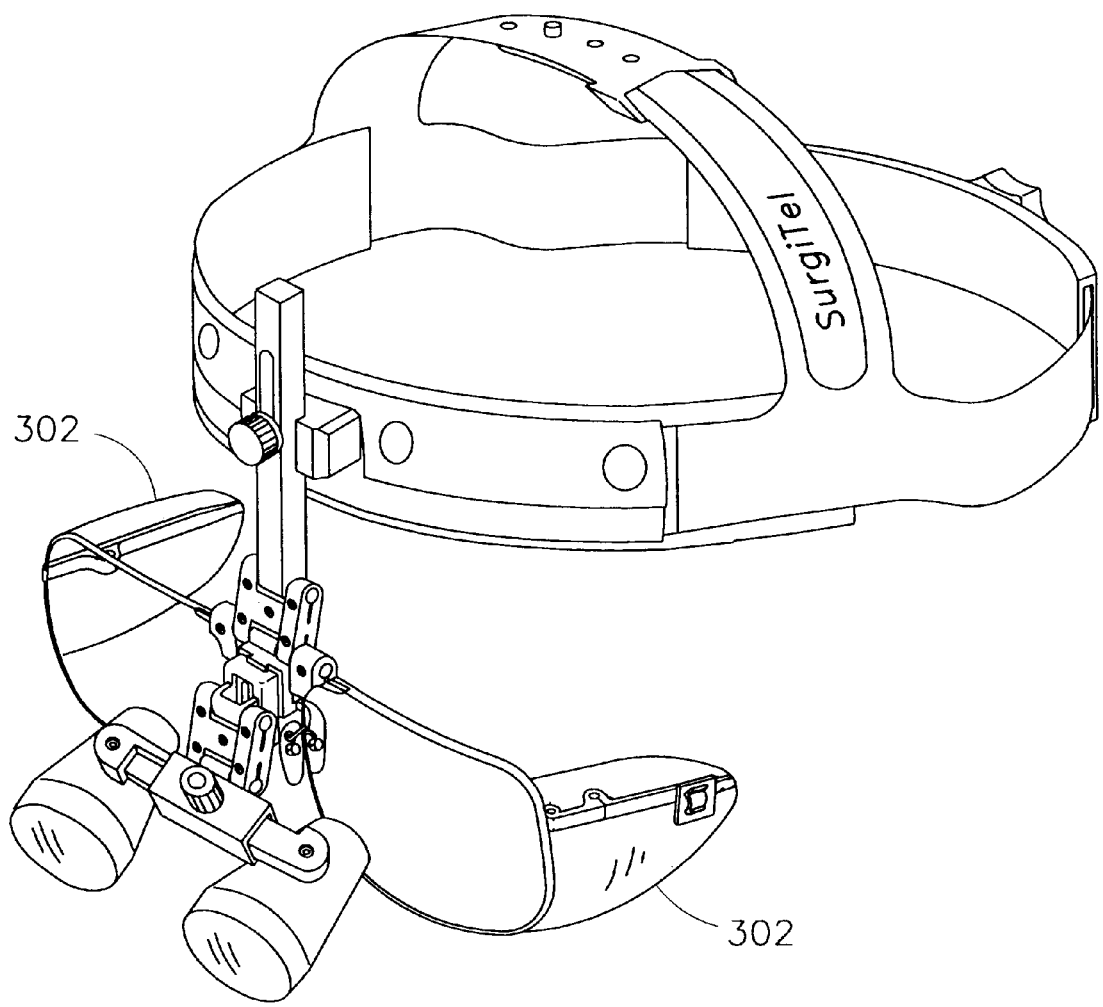
FIG. 3, also from an oblique perspective, depicts means for mounting a frame according to the invention having only side shields, but without temples.

As discussed above, the invention may be used with or without certain facilities associated with the eyeglass frames. For example, as illustrated in FIG. 3, the temple portions of the frames may be eliminated, leaving a pair of side shields 302 which may, as shown, be hingedly affixed to the frames, allowing the shields to be folded down onto the frames. Alternatively, the shields may be made rigid or integrally formed with the eyeglass lenses proper.

Figure 4:
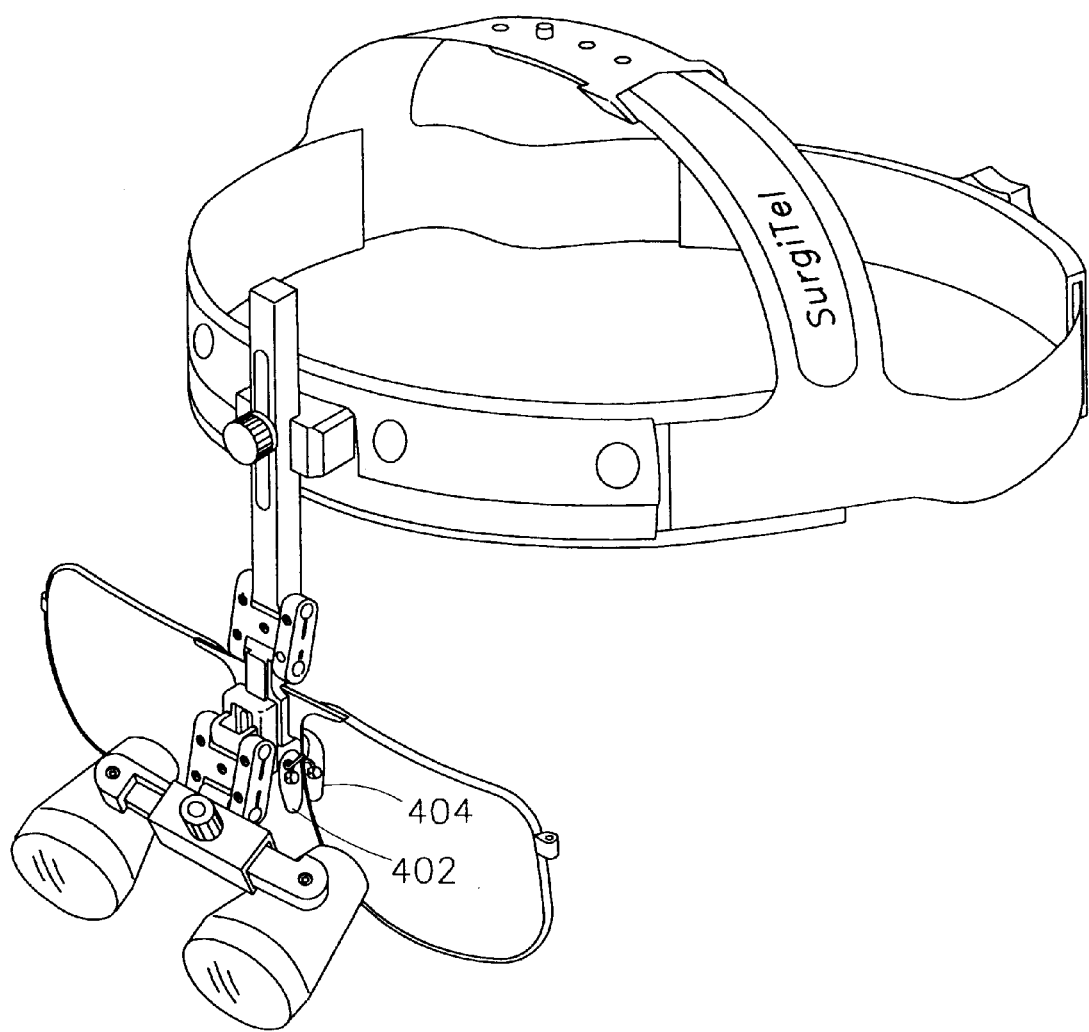
FIG. 4 illustrates yet a further alternative for use in conjunction with eyeglass frames without side shields, but with temples.

As shown in FIG. 4, the temple portions and side shields may be eliminated all together according to the invention with or without the ocular mounting assembly, a configuration which, like that show in FIG. 3, may be desirable in the event that the user wishes to flip up the entire assembly, eyeglass lenses and all, in between delicate procedures. It should be noted that although the figures show both forward and rearward nose pads such as 402 and 404, respectively, either or both may be eliminated according to the present invention, depending upon the application and desire of a particular user.

That claimed is:

1. A versatile optical mounting assembly for use with a pair of eyeglass frames having a horizontally-oriented top edge, the mounting assembly comprising:
    a headband mount having a forward portion;
    a vertical member having a lower end, the forward portion of the headband mount including a slide assembly which receives the vertical member, and a manually operable fastener allowing the vertical member to be vertically adjusted and locked into place once a desired vertical orientation of the member is achieved; and
    a multiple-degree-of-freedom clamp assembly connecting the lower end of the vertical member to the eyeglass frames, the clamp assembly at least facilitating first and second rotational movements about separate axes having locked the vertical member into place, each axis being substantially parallel to the edge of the eyeglass frames.

2. The mounting assembly of claim 1, further including means for attaching a pair of oculars to the clamp assembly.

3. The mounting assembly of claim 2, wherein the means for attaching a pair of oculars to the clamp assembly further includes:
    a slide rail attached centrally to the eyeglass frames;
    a mounting pad received by the slide rail which may be vertically adjusted and locked into place once a desired orientation is achieved; and
    means for attaching the oculars to the mounting pad.

4. The mounting assembly of claim 3, wherein the means for attaching the oculars to the mounting pad further includes a second multiple-degree-of-freedom clamp assembly facilitating first and second rotational movements about separate axes.

5. The mounting assembly of claim 4, wherein the second multiple-degree-of-freedom clamp assembly further includes:
    a body attached to the oculars providing a first pair of opposed horizontal pins coaxial to one of the rotational axes;
    a second pair of opposed horizontal pins provided on the mounting pad which are coaxial to the second separate axis; and
    a second clamping body frictionally encasing both pairs of opposed horizontal pins enabling the clamping body to pivot relative to the mounting pad and the oculars to pivot relative to the second clamping body.

6. The mounting assembly of claim 1, wherein the clamp assembly further comprises:
    a body attached to the eyeglass frames providing a first pair of opposed horizontal pins coaxial to one of the rotational axes;
    a second pair of opposed horizontal pins disposed at the lower end of the vertical member and coaxial to the other rotational axis; and
    a clamping body frictionally engaging both pairs of opposed horizontal pins enabling the clamping body to pivot relative to the vertical member and the eyeglass frames to pivot relative to the body.

7. A versatile optical mounting assembly for use with an ocular mounting assembly and a pair of eyeglass frames having a horizontally-oriented top edge, the optical mounting assembly comprising:

a headband mount having a forward portion;

a vertical member having a lower end, the forward portion of the headband mount including a slide assembly which receives the vertical member, and a manually operable fastener allowing the vertical member to be vertically adjusted and locked into place once a desired vertical orientation of the member is achieved;

a multiple-degree-of-freedom clamp assembly connecting the lower end of the vertical member to the eyeglass frames, the clamp assembly at least facilitating first and second rotational movements about separate axes having locked the vertical member into place, each axis being substantially parallel to the top edge of the eyeglass frames;

a slide rail attached centrally to the eyeglass frames;

a mounting pad received by the slide rail which may be vertically adjusted and locked into place once a desired orientation is achieved; and a second multiple-degree-of-freedom clamp assembly connecting the mounting pad to the ocular mounting assembly.

8. The mounting assembly of claim 7, wherein the second multiple-degree-of-freedom clamp assembly further includes:

a body attached to the oculars providing a first pair of opposed horizontal pins coaxial one of the rotational axes;

a second pair of opposed horizontal pins provided on the mounting pad which are coaxial to the second separate axis; and a second clamping frictionally encasing both pairs of opposed horizontal pins enabling the clamping body to pivot relative to the mounting pad and the oculars to pivot relative to the second clamping body.

* * * * *

UNITED STATES PATENT AND TRADEMARK OFFICE
CERTIFICATE OF CORRECTION

PATENT NO. : 5,920,371
DATED : July 6, 1999
INVENTOR(S) : Byung Jin chang; David Nowak It is certified that error appears in the above-identified patent and that said Letters Patent is hereby corrected as shown below:

Column 6, line 15, after "clamping" insert --body--.

Signed and Sealed this

Fourth Day of January, 2000

Attest:

*Attesting Officer*

*Acting Commissioner of Patents and Trademarks*